US011442979B1

(12) United States Patent
Antony et al.

(10) Patent No.: US 11,442,979 B1
(45) Date of Patent: Sep. 13, 2022

(54) FLEXIBLE IMAGE REPOSITORY FOR CUSTOMER PREMISES EQUIPMENT

(71) Applicant: CSC HOLDINGS, LLC, Bethpage, NY (US)

(72) Inventors: Jaison P. Antony, Dix Hills, NY (US); Heitor J. Almeida, Yorktown Heights, NY (US); John Markowski, Smithtown, NY (US); Peter Caramanica, Westbury, NY (US); Alejandro Hoyos, Jericho, NY (US)

(73) Assignee: CSC Holdings, LLC, Bethpage, NY (US)

( * ) Notice: Subject to any disclaimer, the term of this patent is extended or adjusted under 35 U.S.C. 154(b) by 28 days.

(21) Appl. No.: 16/809,513

(22) Filed: Mar. 4, 2020

(51) Int. Cl.
*G06F 16/51* (2019.01)
*G06F 16/23* (2019.01)
*H04L 67/568* (2022.01)

(52) U.S. Cl.
CPC .......... *G06F 16/51* (2019.01); *G06F 16/2393* (2019.01); *H04L 67/568* (2022.05)

(58) Field of Classification Search
CPC . G06F 16/51; G06F 16/2393; H04L 67/2842; G06T 1/0007
See application file for complete search history.

(56) References Cited

U.S. PATENT DOCUMENTS

| | | | |
|---|---|---|---|
| 9,003,445 B1* | 4/2015 | Rowe | H04N 19/20 725/38 |
| 2005/0246634 A1* | 11/2005 | Ortwein | G06F 16/954 715/234 |
| 2010/0238109 A1* | 9/2010 | Cook | H04N 21/41265 345/173 |
| 2010/0251318 A1* | 9/2010 | Simoes Rodrigues | H04N 21/4316 348/731 |
| 2011/0125755 A1* | 5/2011 | Kaila | G06F 16/54 707/E17.09 |

(Continued)

*Primary Examiner* — William G Trost, IV
*Assistant Examiner* — Abdelbasst Talioua
(74) *Attorney, Agent, or Firm* — Sterne, Kessler, Goldstein & Fox P.L.L.C.

(57) ABSTRACT

The present disclosure describes an autonomous mechanism for implementing a flexible image repository that includes an image retrieval service and an image repository management application. The flexible image repository performs delta processing to provide a subset of stored images to a subscriber device when the image retrieval service receives an image update request. The subscriber device thus receives updates to the image repository in a manner that reduces bandwidth requirements at both the server and the client, allowing client-side images to be updated more frequently. A content manager may update the flexible image repository via the image repository management application, which tags images according to a naming convention prior to inserting the images in the image repository. The tags allowing the image retrieval service to serve a multitude of subscriber devices across disparate platforms, which may provide different interfaces and have disparate access requirements, API calls, or functional behaviors. The flexible image repository employs a caching layer to further optimize the retrieval and display of the images and further optimize the delta processing.

20 Claims, 6 Drawing Sheets

(56) References Cited

U.S. PATENT DOCUMENTS

| | | | |
|---|---|---|---|
| 2012/0151528 A1* | 6/2012 | Mathews | H04N 21/2353 725/39 |
| 2012/0210356 A1* | 8/2012 | Kiok | H04N 21/23109 725/39 |
| 2014/0189539 A1* | 7/2014 | St. Clair | G06Q 50/01 715/753 |
| 2014/0372743 A1* | 12/2014 | Rogers | G06F 21/575 713/155 |
| 2015/0063471 A1* | 3/2015 | Zhu | H04N 19/17 375/240.29 |
| 2015/0206447 A1* | 7/2015 | Vahid | G09B 5/08 434/362 |
| 2015/0222741 A1* | 8/2015 | Kim | H04W 4/12 455/414.1 |
| 2016/0283483 A1* | 9/2016 | Jiang | G06F 16/58 |
| 2017/0124057 A1* | 5/2017 | Canton | G06F 40/177 |
| 2018/0268441 A1* | 9/2018 | Triano | G06Q 30/0273 |
| 2018/0343491 A1* | 11/2018 | Loheide | H04L 67/51 |
| 2020/0272656 A1* | 8/2020 | Ito | G06V 20/30 |
| 2021/0225005 A1* | 7/2021 | Vartakavi | G06V 10/25 |

* cited by examiner

FLEXIBLE IMAGE REPOSITORY FOR CUSTOMER PREMISES EQUIPMENT

BACKGROUND

Service providers may offer media content to subscribers through a client device, such as Customer Premises Equipment (CPE) and other Internet Protocol (IP) enabled devices. The client device generally provides or accesses an interface that enables a dialog between a user operating the client device and a server exposed by the service provider. The user may operate the client device using a remote control, touch screen, keyboard, or other suitable input mechanism to send communications to the service provider.

A user interface may allow subscribers to browse, examine, record, and playback available media content and perform other suitable actions. The user interface may be dynamic and graphic-rich and may incorporate a large number of images to fashion an interactive user experience. These images may change frequently, require significant disk storage, and consume a substantial amount of bandwidth when transmitted between a client and server. The user interface may also accommodate varying dimensions and resolutions depending on a screen display available on the client device, and images in the user interface may need to conform to these display requirements.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Overview

Figure 1:
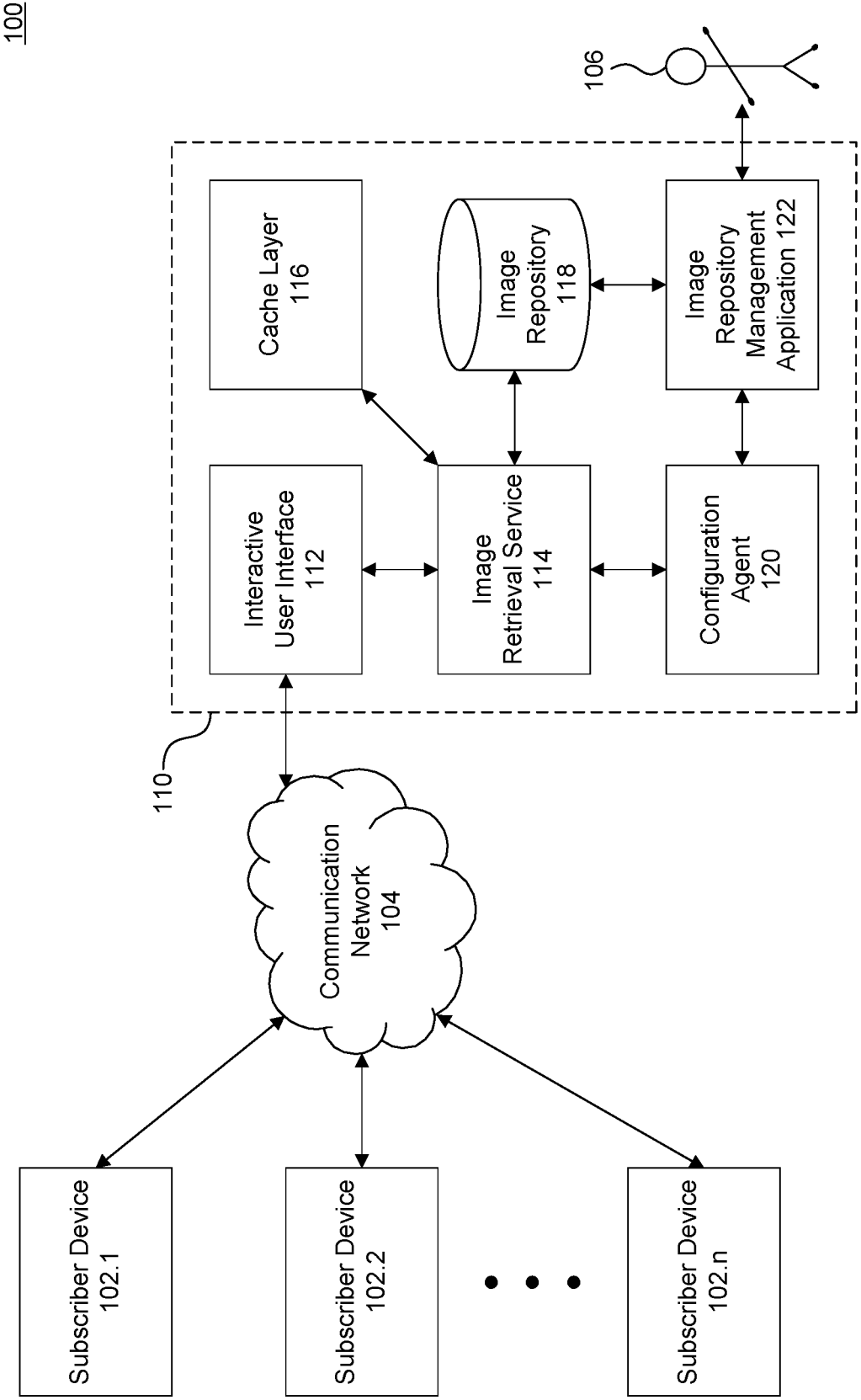
FIG. 1 illustrates a block diagram of an exemplary point-to-multipoint communication system including a service provider system that harnesses an image retrieval service and an image repository management application, according to some embodiments.

Provided herein are system, apparatus, device, method and/or computer program product embodiments, and/or combinations and sub-combinations thereof, for implementing a flexible image repository. The flexible image repository performs delta processing to provide a subset of stored images to a subscriber device in response to an image update request. The images display in an interactive user experience furnished by a point-to-multipoint communication system that allows subscriber devices to browse available media content. The flexible image repository employs a caching layer to optimize the retrieval, update, transmission, and display of images in the user experience. The flexible image repository leverages an image repository management application that allows content managers to update the images in the image repository. The management application tags images according to a naming convention that standardizes image cataloging, allowing the flexible image repository to serve multiple platforms with differing user interfaces.

Service providers may provide services to subscribers that offer media content such as movies, television shows, news, and/or sports programming, to provide some examples. To allow subscribers to browse and interact with the media content, service providers may advance a graphical user interface that provides a dynamic, interactive, immersive user experience. In some embodiments, such a graphical user interface may include an electronic programming guide (EPG) that displays the programming and channels offered by the service provider. A subscriber may select programs and channels within the EPG to receive additional information about the selected program/channel. The user interface may also allow subscribers to initiate recordings, schedule recordings, playback previously created recordings, control playback in a variety of fashions, and perform other suitable video-on-demand functions. Subscribers may perform a variety of other functions and actions in such a user interface, as will be understood by one skilled in the relevant art(s).

The graphical user interface may incorporate a large number of rich, colorful, and expressive graphics, images, and other media files to build and present an immersive, interactive, and dynamic user experience. Such images may be static, e.g., a single, unmoving graphic, or dynamic, e.g., an animation or short movie. Images may vary according to the types of media content displayed and by the functions executed by a subscriber with respect to the media content. For example, in an EPG, an image may display in association with a channel or channels, e.g., a logo or other indicator of the source of the channel. For further example, when viewing details about a particular program, a poster may display as the background that reflects the particular program being viewed, e.g., a movie poster may display when a subscriber views the details of a movie or selects the movie for playback.

These dynamic and rich images presented in the immersive graphical user interface may require significant storage space. Some images may be large files, especially when the image has a higher resolution or is a dynamic image. Moreover, the sheer number of images used in the immersive user experience may present significant additional storage and bandwidth complexities, as a unique image may exist for each piece of media content offered by the service provider. For example, if a service provider offers a large number of movies or television programs to subscribers, each movie and program may display a unique poster when a subscriber views the program information. Moreover, different versions of the same image may be stored to accommodate various subscriber devices, screen displays, resolutions, and other suitable requirements. A subscriber may also resize the screen display, causing the image to update automatically in response.

Additionally, images may change frequently in some platforms. In one use case, new media content may become available having new images to associate with the new media content. Existing images may not exist to address the new content, and a content manager may add a new image in association with the new content. For example, additional channels may become available to display in an EPG, and a content manager may add a new image to the image repository in association with the new channel. In another use case, content managers may modify or update images associated with existing media content. For example, service providers may change images associated with media content for business, artistic, aesthetic, or other suitable reasons.

As an additional complicating factor, a service provider may offer multiple platforms, products, brands, sub-brands, etc. For example, a service provider may present a first immersive graphical user interface in association with a first platform, and a second immersive graphical user interface in association with a second platform. The available platforms may vary by geographical region, for example. While the first immersive graphical user interface and the second immersive graphical user interface may differ in many regards, both interfaces may display similar images in association with duplicative media content, EPGs, and other interface features. Thus, though a service provider may offer different platforms, a single image repository may retrieve and provide images across the differing platforms.

Legacy solutions fail to provide suitable tools that allow content managers to add, update, delete, and modify images displayed in an immersive user experience offered by a service provider. For example, storing the images in a simple file system and employing a web server to serve the images faces limitations in disk space, portability, and bandwidth usage. Such a solution also fails to service multiple platforms (providing differing graphical user interfaces) using the same image repository.

Accordingly, a need exists to implement a flexible image repository that performs delta processing to provide a subset of stored images to a subscriber device. Delta processing provides a further technical benefit in that a subscriber device may update a client-side cache of the images at a reduced bandwidth and processing cost. Accordingly, such updates may occur more frequently, e.g., each time the subscriber device powers on, according to a schedule, or upon reception of a notification from the service provider system.

An additional need exists to employ a caching layer in an image retrieval service that accesses the image repository to further optimize the retrieval and display of the images and improve the efficacy of the delta processing. A further technical benefit is realized by employing the caching layer because the image retrieval service may avoid accessing the image repository when serving images and performing delta processing, thereby reducing or eliminating an I/O bottleneck that may otherwise arise when accessing the actual disk storage. Thus, in a system having hundreds, thousands, millions, or more of subscriber devices, by storing the updated images in the caching layer at the service provider, additional accesses to the actual image repository are reduced thereby optimizing the efficiency of the system in its entirety.

A further need exists to provide a management application that tags images according to a naming convention, which allows the flexible image repository to service a multitude of subscriber devices, platforms, and user interfaces. A further technical benefit of the image repository is that by tagging images according to a specific naming convention, the image repository may service multiple platforms that use the same images but may have different access requirements, API calls, or functional behaviors. This also offers content owners additional flexibility, brand control, and customization over legacy solutions.

Exemplary Point-to-Multipoint Communication System

FIG. 1 illustrates a block diagram of an exemplary point-to-multipoint communication system including a service provider system offering an image retrieval service and an image repository management application, according to an embodiment of the present disclosure. Point-to-multipoint communication system 100 includes subscriber devices 102.1 through 102.$n$, communication network 104, content manager 106, and service provider system 110.

Subscriber devices 102.1 through 102.$n$ may represent one or more personal computers, data terminal equipment, one or more telephony devices, such as one or more mobile phones or one or more mobile computing devices to provide some examples, one or more broadband media players, one or more network-controlled appliances, one or more set-top boxes, one or more wireless routers, CPEs, and/or other devices that are capable of transmitting and/or receiving video, audio, and/or data that will be apparent to those skilled in the relevant art(s) without departing from the spirit and scope of the present disclosure. Subscriber devices 102.1 through 102.$n$ may allow a subscriber to interact with a dynamic, graphic-rich, interactive user interface, i.e., an immersive user experience, that allows the subscriber to browse, playback, and gather more information about media content offered by service provider system 110. In one embodiment, subscriber devices 102.1 through 102.$n$ may generate and render the dynamic user interface provided to the subscriber. In another embodiment, subscriber devices 102.1 through 102.$n$ may passively interact with a dynamic user interface generated at service provider system 110 by interactive user interface 112. In other embodiments, a combination of these approaches may be used, i.e., some interface components may be generated by interactive user interface 112 and provided to subscriber devices 102.1 through 102.$n$ while client-side components may be generated by the subscriber devices. Using the immersive user experience, a subscriber may browse and interact with the media content, view an EPG, receive additional information about desired programs/channels, initiate recordings, schedule recordings, playback previously created recordings, control playback in a variety of fashions, and perform other suitable functions related to the media content. The user experience may incorporate a large number of rich, colorful, and expressive graphics, which may require significant storage to house.

Subscriber devices 102.1 through 102.$n$ may use sufficient storage, e.g., hard disks or other storage mechanisms, to store a local cache of the images and graphics used in the immersive user experience, duplicating the images stored in a centralized image repository, described below as image repository 118. The images stored in this local cache may require a significant amount of disk storage, and transmitting or receiving the images may require a significant amount of bandwidth. Accordingly, subscriber devices 102.1 through 102.$n$ may refrain from updating local images repository in real-time or near real-time, instead updating the local cache periodically, i.e., when an image update request occurs, to avoid interfering with content viewing and other primary functions of the media content platform. In some embodiments, such an image update request may occur when a subscriber powers on a subscriber device in subscriber devices 102.1 through 102.$n$. In another embodiment, the image update request may occur in accordance with a schedule that specifies a refresh interval, e.g., once a week, once a month, etc., as configured by an administrator at service provider system 110. In another embodiment, subscriber devices 102.1 through 102.n may receive a notification that an image update request should be conducted based on a change to image repository 118 conducted by content manager 106 via image repository management application 122. For example, service provider system 110 may transmit such a notification to all subscriber devices 102.1 through 102.n informing the subscriber devices of the change and alerting the devices that an image update request should be performed as soon as possible or practical. In another embodiment, a subscriber may perform a factory reset to restore the device to its original operating conduction, and the image update request may result in the subscriber device being restored to its initial state. In each embodiment, subscriber devices 102.1 through 102.n may transmit the image update request to interactive user interface 112 and/or image retrieval service 114, receive a suitable subset of images in response, and update the local cache of images to match image repository 118. In so doing, image retrieval service 114 may perform delta processing to provide a subset of the images stored in image repository 118 to the subscriber device, as described in further detail in the description below accompanying FIG. 3 below.

Communication network 104 communicatively couples service provider system 110 to subscriber devices 102.1 through 102.n. Communication network 104 may be implemented as a wireless communication network, a wired communication network, and/or any combination thereof as will be apparent to those skilled in the relevant art(s) without departing from the spirit and scope of the present disclosure. For example, communication network 104 may include one or more radio networks, such as terrestrial radio frequency networks or satellite radio frequency networks, one or more coaxial cable networks, one or more fiber optic cable networks, and/or another suitable communication network.

Content manager 106 may be an individual interacting with service provider system 110 via image repository management application 122. In one embodiment, content manager 106 may be associated with the service provider, e.g., an employee, and may be responsible for uploading, configuring, administering, etc., graphics and images in the immersive user experience provided by service provider system 110. In another embodiment, content manager 106 may be associated with an owner of the media content offered by the service provider, and content manager 106 may be validated using appropriate security credentials to be able to access repository management application 122. In this embodiment, content manager 106 may update images stored in the repository on behalf of the owner of the media content, thus dispersing the responsibility of managing the images in the image repository while offering content owners additional flexibility, brand control, and customization. In either use case, content manager 106 may be tasked with adding, updating, deleting, changing, etc. the images stored in image repository 118 and configuring associations between the images and the available media content. Content manager 106 may employ one or more personal computers, mobile devices, etc. to connect to image repository management application 122 using a suitable network such as the Internet, a local area network (LAN), a wide area network (WAN), a wireless network, a cellular network, or various other types of networks as will be understood by one skilled in the relevant art(s).

Service provider system 110 may provide a service offering media content to subscribers that is accessible using subscriber devices 102.1 through 102.n. The media content may include video, audio, and/or data, such as movies, television shows, news, and/or sports programming to provide some examples. To allow subscribers to browse and interact with the media content, service provider system 110 may offer an immersive user experience in the form of a graphical user interface that conveys information about media content. The immersive user experience may include features such as an EPG and video-on-demand. The immersive user experience may incorporate a large number of rich, colorful, and expressive graphics, images, and other media files. Service provider system 110 may include interactive user interface 112, image retrieval service 114, cache layer 116, image repository 118, configuration agent 120, and image repository management application 122.

Interactive user interface 112 may present subscribers with an immersive user experience via which subscribers may access and interact with content provided by a service provider. Interactive user interface 112 may include an EPG, VOD features, and other functions related to the provided content. Interactive user interface 112 may be generated within service provider system 110, generated at subscriber devices 102.1 through 102.n, or created using a hybrid approach with interface components generated in both locations. Interactive user interface 112 may present rich graphics, images, and other media content as part of the user experience. For example, subscribers may view a variety of images tailored to the programs or channels being accessed or viewed. The richness of the images may present complications, however, in that image files are typically larger than textual data or other simple data forms. Thus, one skilled in the relevant art(s) will understand that bandwidth and space conservation are paramount concerns for interactive user interface 112. To address these concerns, interactive user interface 112 may leverage image retrieval service 114.

Image retrieval service 114 may retrieve images displayed in interactive user interface 112 when presenting an immersive user experience to a subscriber. Image retrieval service 114 may receive a request for an image in the process of displaying an immersive user experience and may provide that image to interactive user interface 112. Though FIG. 1 displays image retrieval service as existing entirely within service provider system 110, in some embodiments, a local version of image retrieval service 114 may operate on each subscriber device among subscriber devices 102.1 through 102.n that accesses the local cache of images. Image retrieval service 114 may retrieve images by adhering to a specific naming convention across all retained images, as described in further detail below. In this fashion, image retrieval service 114 may provide an appropriate image in response to an image request corresponding to a particular piece of media content or other facet of the immersive user interface. The image may also be specific to particular location/feature of the immersive user experience and to the image resolution and/or screen display required by a particular subscriber device among subscriber devices 102.1 through 102.n. Additionally, the particular subscriber may resize the screen display after receiving the image and, in response, image retrieval service may resize the image or transmit an updated image to match the resized screen display.

As described above, in some embodiments, to achieve efficiency gains, a local version of the image retrieval service may access and provide the images required by the immersive user experience when rendering a user experience on subscriber device in subscriber devices 102.1 through 102.n. In this fashion, when rendering the immersive user experience on subscriber devices 102.1 through 102.*n*, image requests may be satisfied without accessing service provider system 110 or image repository 118. One skilled in the relevant art(s) will appreciate the importance of such a bandwidth saving mechanism in a distributed system having a large number of subscriber devices.

However, in such embodiments, service provider system 110 needs to coordinate and synchronize local caches with changes that occur in image repository 118. Thus, image retrieval service 114 may respond to image update requests from subscriber devices 102.1 through 102.*n*. To efficiently propagate image changes to subscriber devices 102.1 through 102.*n*, image retrieval service 114 may use delta processing to provide only a subset of the images in image repository 118 to a requesting subscriber device.

To perform delta processing, image retrieval service 114 may catalog, track, and store a last modified timestamp for each image in image repository 118. The last modified timestamp may reflect the date and time of the previous change, e.g., add or update, to the image. The changes may be received from content manager 106 via image repository management application 122. For example, if an image never changed after an initial upload, the last modified timestamp may be the date and time that content manager 106 uploaded the image to the repository. However, if content manager 106 later updated the image, e.g., uploaded a new logo for a channel that displays in an EPG to replace the old log, then the last modified timestamp may reflect the date and time of the later change.

For delta processing, the first time that a particular subscriber device among subscriber devices 102.1 through 102.*n* accesses service provider system 110, image retrieval service 114 may transmit the entirety of image repository 118 to the particular subscriber device for storage in the local cache. One skilled in the relevant art(s) will appreciate that such a transmission may be time consuming and put a strain on bandwidth and other system resources. Thus, such a transmission may occur as part of a general initialization/configuration routine for a particular subscriber device. When the initialization routine finalizes, the new subscriber device may store locally a last fetch timestamp relating to the completion of the initialization routine. In other embodiments, services provider system 110 may store the last fetch timestamp on the server-side for each of subscriber devices 102.1 through 102.*n*. In one embodiment, the initialization routine may be performed in response to a factory reset. In this embodiment, when the factory reset is performed, the reset subscriber device may delete all images in the local cache and download the entirety of image repository 118 to return the subscriber device to an initial state.

After the initialization routine completes, subscriber devices 102.1 through 102.*n* may transmit an image update request to image retrieval service 114 to receive any changed images. Such an image update request may occur for a variety of reasons across several use cases, e.g., when a subscriber powers on a subscriber device, in accordance with a configured refresh interval, or in response to a notification from service provider system 110. In an embodiment, where service provider system 110 sends notifications to all subscriber devices, the system may propagate updates to image repository 118 in real-time or near real-time.

When processing the image update request using delta processing, a particular subscriber device among subscriber devices 102.1 through 102.*n* may transmit a last fetch timestamp associated with the particular subscriber device to image retrieval service 114 with the image update request. In another embodiment, the particular subscriber device may include a unique identifier in the transmission, i.e., a subscriber identifier, and image retrieval service 114 may retrieve the last fetch timestamp for the particular subscriber device from server-side storage.

Image retrieval service 114 may compare the last fetch timestamp associated with the particular subscriber device to a tracked last modified timestamp associated with each of the images in image repository 118. Image retrieval service 114 may include images with a last modified timestamp greater than the received last fetch timestamp in a subset of images. Thus, the subset of images includes only those images that changed from the last fetch timestamp, i.e., the time of the last image update request from that particular subscriber device.

To finalize delta processing, image retrieval service 114 may then transmit only the subset of images to the particular subscriber device that sent the image update request. The particular subscriber device may then refresh its local cache of the images in image repository 118 by replacing local images with those contained in the transmitted subset, where appropriate. The particular subscriber device may then update its last fetch timestamp to reflect the successful refresh. In this fashion, subscriber devices 102.1 through 102.*n* avoid the expense of receiving (and service provider system 110 avoids the expense of transmitting) the entirety of image repository 118. Such an approach may provide a gigantic bandwidth savings in a distributed system employing hundreds, thousands, or millions of subscriber devices. Delta processing in this fashion is described in further detail below with reference to FIG. 3.

Cache layer 116 may provide caching functions within service provider system 110. Cache layer 116 may store and retrieve images from memory as opposed to accessing the hard-disk storage of image repository 118 and provide these images to image retrieval service 114. Whereas the local cache used by each subscriber device allows the subscriber device to display images in the immersive user experience without accessing service provider system 110, cache layer 116 provides an additional caching layer that further optimizes system performance by limiting trips by image retrieval service 114 to image repository 118 when satisfying image update requests. By employing cache layer 116, service provider system 110 minimizes trips to image repository 118 and system performance improves. Caching at service provider system 110 is described in further detail below with reference to FIG. 5.

Image repository 118 may store the images used in an immersive user experience. Image repository 118 may store a large number of rich, colorful, and expressive graphics. Image repository 118 may include both static and dynamic images. The image files may vary according to the types of media content and functions available in an immersive user experience. Each image in image repository 118 may be associated with a particular graphic displayed to subscribers in interactive user interface 112 through the use of a standardized naming convention. Image repository 118 store the images using, for example on a NAS, SAN, local hard drive, or other suitable storage mechanism and provide appropriate mechanisms via which the images may be accessed or served via HTTP or other suitable protocol.

Configuration agent 120 may provide mechanisms via which configurations may be managed, tracked, and stored that govern the behavior of service provider system 110. Configuration agent 120 may store a variety of confirmation variables relevant to the behavior of image retrieval service 114 and image repository management application 122. For example, configuration agent 120 may store information about the frequency of image updates. Configuration agent 120 may also store authentication credentials for content managers, such as content manager 106, and other administrators.

Image repository management application 122 may provide content manager 106 with the ability to manage the images and media content stored in image repository 118. Image repository management application 122 may allow content manager 106 to add new images, update existing images, delete images, and associate images with media content. Image repository management application 122 may allow content manager to update images across resolutions and screen display sizes. In an embodiment, image repository management application 122 may allow content manager 106 to upload additional media content, in addition to the images, and to upload and associate images with the additional media content.

When receiving a new or updated image, image repository management application 122 may tag the image in accordance with a naming convention. In an embodiment, image repository management application 122 may tag the image with a logical path that includes a client type, an image type, and an entity name. In other embodiments, image repository management application 122 may employ another naming convention that provides similar functionality.

The client type may specify a type of client, e.g., a CPE device, a set-top box, a mobile device, a streaming service, etc. Example client type tags may be "STB", "MOBILE", "STREAMINGSERVICE", etc. In one embodiment, the client type may be defined based on the aspect ratio of the underlying client platform. In such an embodiment, a tag may be applied to multiple platforms provided the platforms share an aspect ratio. This feature allows image repository 118 to service various platforms and vendors.

The image type may represent an orientation of the image or platform, e.g., portrait, landscape, etc. In this fashion, image retrieval service 114 may differentiate which image to transmit based on the screen display size. In one embodiment, the image type may include an image size and resolution applicable to the image. For example, one channel logo image may have an image type of "GRID_16_9" and a second channel logo image may have an image type of "GRID_4_3." The entity name may refer to a specific category of an image on a specific screen in the immersive user experiences, e.g. an EPG grid, a poster, an icon, etc.

Exemplary Subscriber Device in the Point-to-Multipoint Communication System

Figure 2:
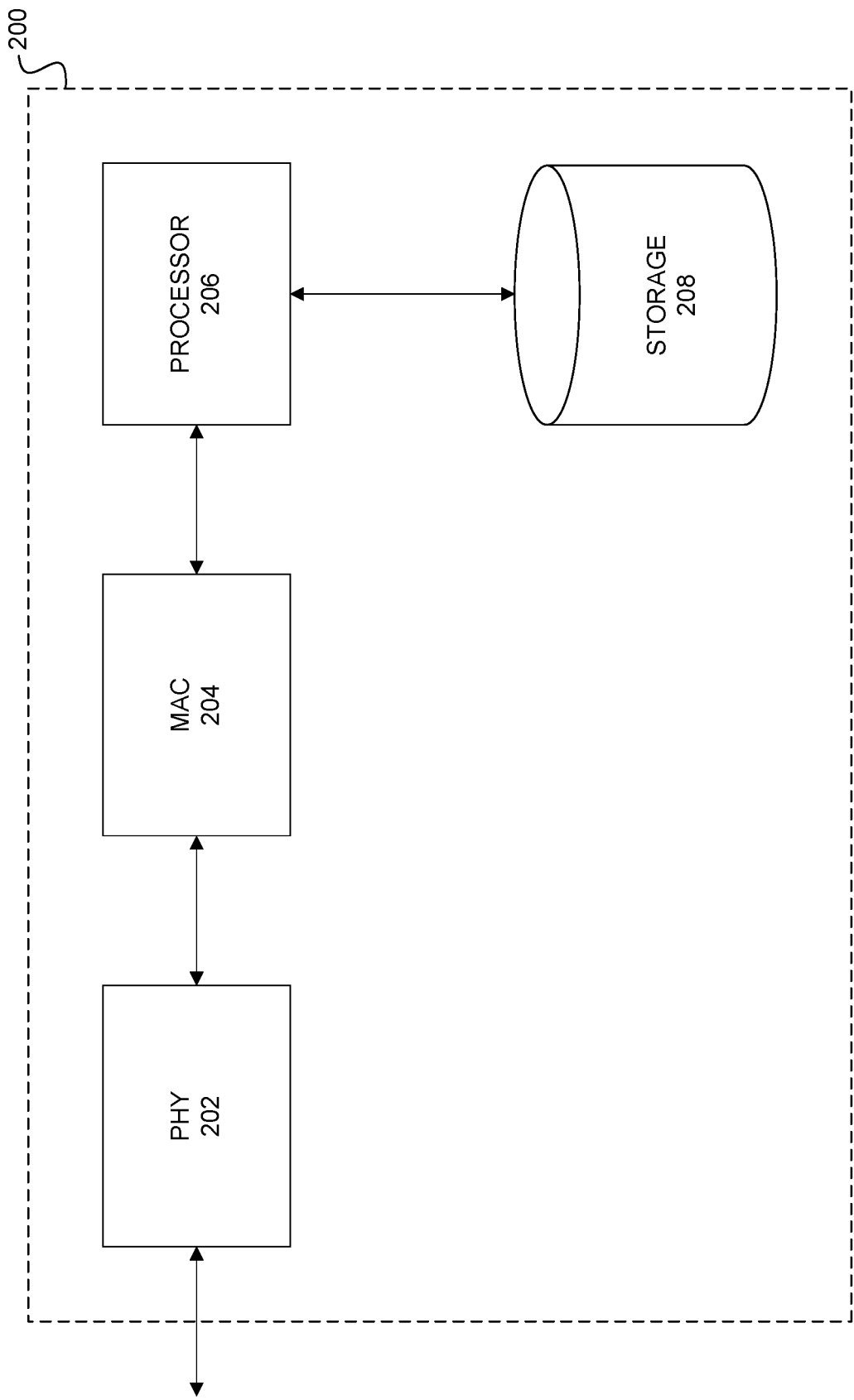
FIG. 2 illustrates a block diagram of a subscriber device, according to some embodiments.

FIG. 2 illustrates a block diagram of an exemplary subscriber device 200 in exemplary point-to-multipoint communication system 100, according to an embodiment of the present disclosure. Subscriber device 200 may represent an exemplary embodiment of subscriber devices 102.1 through 102.n. As described above, subscribers may access the services offered by services providers using subscriber devices 102.1 through 102.n, which includes set-top boxes, personal computers, data terminal equipment, one or more telephony devices, such as one or more mobile phones or one or more mobile computing devices to provide some examples, one or more broadband media players, one or more network-controlled appliances, one or more set-top boxes, one or more wireless routers, and/or other devices that are capable of transmitting and/or receiving video, audio, and/or data that will be apparent to those skilled in the relevant art(s) without departing from the spirit and scope of the present disclosure. As illustrated in FIG. 2, subscriber device 200 includes PHY circuitry 202, media access controller (MAC) circuitry 204, processor circuitry 206, and storage medium 208.

PHY circuitry 202 represents an interface between a communication network, such as communication network 104 to provide an example, and MAC circuitry 204. Generally, PHY circuitry 202 may modulate, encode, and/or convert an information frame to provide an information signal for transmission to the communication network. PHY circuitry 202 may also demodulate, decode, and/or convert an information signal received over a communication network to provide an information frame.

MAC circuitry 204 represents an interface between PHY circuitry 202 and processor circuitry 206. MAC circuitry 204 may manage and maintain communication by coordinating access to the communication network and formatting communication in accordance with one or more communication standards or protocols. MAC circuitry 204 may also de-encapsulate or de-frame in accordance with the one or more communication standards or protocols.

Processor circuitry 206 controls the overall operation of subscriber device 200. Processor circuitry 206 may perform functions relevant to presenting or viewing an immersive user experience, described above as interactive user interface 112. In one embodiment, processor circuitry 206 may retrieve the images from a local cache and incorporate the images into a generated user experience. Processor circuitry 206 may also process user requests, process inputs made within the graphical user interface, manage and control provision of the media content once transmitted/received, control the entry into and out of a standby mode, power the device on/off, load an operating system, and/or perform other suitable processing functions related to subscriber device 200. Processor circuitry 206 may perform actions to ensure that the local cache of images remains up-to-date with changes made in image repository 118. For example, processor circuitry 206 may generate an appropriately formed image request update, transmit the request to service provider system 110, receive an appropriate subset of images in response, and perform required updates to the local cache of images in response.

Storage medium 208 stores a local cache of images, various database tables or other suitable information about subscriber device 200, and other information needed to perform the functions offered by the service provider system. Storage medium 208 may store configuration information as text files within a volatile memory, such as random access memory (RAM), and/or non-volatile memory, such as read-only memory (ROM). The RAM may be implemented in dynamic random-access memory (DRAM), a static random-access memory (SRAM), and/or a non-volatile random-access memory (NVRAM) configuration to provide some examples. Storage medium 208 may be organized into a database and may leverage any suitable database management system to store information. Storage medium 208 may store a unique identifier, i.e., a subscriber identifier, for a particular subscriber device 200 for purposes of identifying subscriber device 200 in communications with service provider system 102. Storage medium 208 may store a local cache of the images used within an immersive graphical user interface provided by a service provider. Storage medium 208 may also store a last fetch timestamp for subscriber device 200, reflecting the date and time of the last refresh of the local cache of images housed in storage medium 208.

Figure 3:
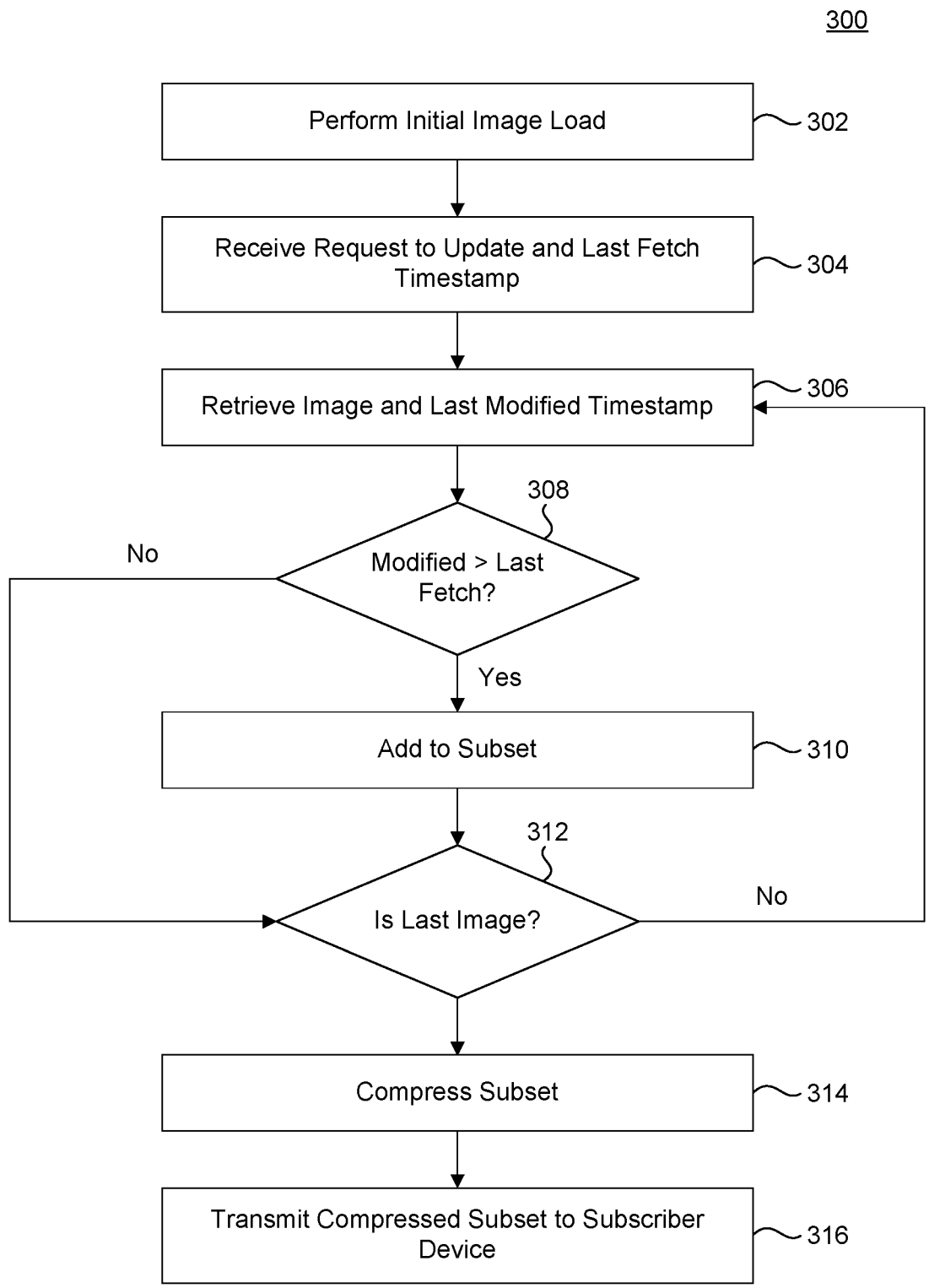
FIG. 3 is a flowchart illustrating a method of performing delta processing to provide a subset of stored images to a subscriber device, according to some embodiments.

Exemplary Method of Performing Delta Processing to Update a Local Cache of Images on a Subscriber Device FIG. 3 is a flowchart of exemplary operational steps to perform delta processing to update a local cache of images stored on a subscriber device, according to an embodiment of the present disclosure. The disclosure is not limited to this operational description. Rather, it will be apparent to ordinary persons skilled in the relevant art(s) that other operational control flows are within the scope and spirit of the present disclosure.

At operation 302, image retrieval service 114 may perform an initial image load. In one exemplary use case, image retrieval service 114 may perform the initial image load for a particular subscriber device among subscriber devices 102.1 to 102.n as part of an initialization routine during which the particular subscriber device's local cache may be constructed. Such an initial image load may occur, for example, the first time that the particular subscriber device connects to service provider system 110. In response, image retrieval service 114 may transmit all of the images in the image repository to the subscriber device. Prior to transmitting the images, image retrieval service 114 may compress the images to increase the speed and efficiency of the transmission. Moreover, image retrieval service may access all of the images from cache layer 116 to avoid accessing image repository 118. However, one skilled in the art(s) will appreciate that transmitting the entirety of the image repository in this fashion to the particular subscriber device may be a time-consuming and resource-intensive process. When the transmission completes, image retrieval service 114 may update the last fetch timestamp associated with the particular subscriber device to match the time that the transmission completes. In one embodiment, the last fetch timestamp may be stored on the particular subscriber device, e.g., in storage medium 208, but in another embodiment, image retrieval service 114 may update a server-side database table that tracks the timestamps across all subscriber devices 102.1 through 102.n with the updated last fetch timestamp.

At operation 304, interactive user interface 112 may receive an image update request from a particular subscriber device among subscriber devices 102.1 through 102.n. Such an image update request may occur at suitable times after the initial loading of the images conducted in 302. For example, the image update request may occur when a subscriber powers on the particular subscriber device or the image update request may occur according to a refresh interval specified in configuration agent 120. The received request may include the last fetch timestamp for the particular subscriber device, or the image update request may include a unique identifier related to subscriber device, i.e., a subscriber identifier, and the last fetch timestamp may be retrieved from storage using the subscriber identifier. In either case, the last fetch timestamp indicates the last time that the particular subscriber device sent an image update request to update the local cache of images stored on the particular subscriber device.

Operations 306 to 312 are iterative and may repeat for each image in image repository 118. At operation 306, image retrieval service 114 may retrieve an image from either cache layer 116 or image repository 118 and determine the last modified timestamp associated with the image. Image retrieval service 114 may determine the image to examine alphabetically, sequentially, chronologically, or using another suitable methodology. The last modified timestamp may be determined by accessing metadata associated with the file, examining a database table, or using another suitable approach. The image may be retrieved from the cache layer where the cache layer includes the image and the image is not stale. This process is described in further detail below with reference to FIG. 5.

At 308, image retrieval service 114 compares the last modified timestamp associated with the image retrieved in 306 to the last fetch timestamp received associated with the particular subscriber device. In this fashion, image retrieval service 114 determines if the image changed in the server-side image repository since the last time the particular subscriber device requested an image update. If the last modified timestamp of the image is greater than the last fetch timestamp, i.e., the image needs to be transmitted, then method 300 may proceed to 310. If the last modified timestamp is less than or equal to the last fetch timestamp, i.e., the image does not need to be transmitted to the particular subscriber device, then method 300 may proceed to 312.

At 310, image retrieval service 114 may add the image to the subset of images to be returned to the subscriber device. The subset of images may be tracked using any suitable method. In one embodiment, the image may be represented using a suitable array, pointer, etc., and the subset of images may be composed of pointer, lists, or other variables representing the images to be transmitted to the particular subscriber device. In another embodiment, a temporary archive of images may be stored in memory representing the subset of images and the changed image may be added to the archive.

At 312, image retrieval service 114 determines if the image retrieved in 306 is the last image in the image repository. In other words, image retrieval service 114 determines if all images in image repository 118 have been checked for updates with respect to the last fetch timestamp. If the image is not the final image, then method 300 returns to 306 to process additional images in image repository 118. If the image retrieved is the last image in the image repository, then method 300 may proceed to 314.

At 314, image retrieval service 114 may compress the subset of images determined in the iterative steps 306 through 312. Image retrieval service 114 may compress the subset of image using a suitable compression algorithm or methodology. For example, where the subset of images is an archive stored in memory, image retrieval service 114 may zip the archive resulting in a single file to transmit. Where the subset of images includes pointers to the images to transmit, image retrieval service 114 may retrieve the image files from cache layer 116 and/or image repository 118 and build an appropriate archive for transmission to the particular subscriber device.

At 316, image retrieval service 114 may transmit the compressed subset to the particular subscriber device that completed the image update request in 304. The particular subscriber device may decompress the received subset. The particular subscriber device may then refresh its local cache of the images by replacing local images with those contained in the received subset. Image retrieval service 114 may then update the last fetch timestamp associated with the particular subscriber device and/or the particular subscriber device may update this information stored in storage medium 208. In this fashion, the expense of transmitting the entirety of the image repository for each image update request may be avoided because only a compressed subset of images is transmitted by image retrieval service 114 and received by the particular subscriber device. Such an approach may provide a gigantic bandwidth and input/output savings in a distributed system employing hundreds, thousands, or millions of subscriber devices.

Exemplary Method to Tag Received Images

Figure 4:
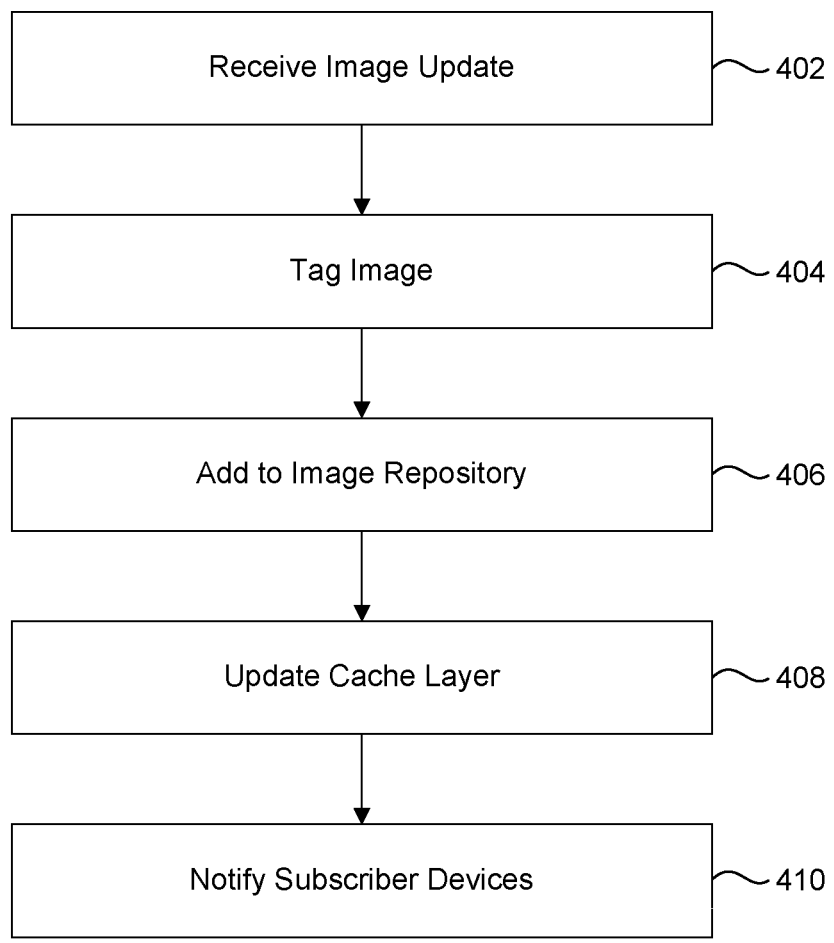
FIG. 4 is a flowchart illustrating a method of adding an image received from an image repository management application to an image repository, according to some embodiments.

FIG. 4 is a flowchart of exemplary operational steps to upload an image received from an image repository management application to an image repository, according to an embodiment of the present disclosure. The disclosure is not limited to this operational description. Rather, it will be apparent to ordinary persons skilled in the relevant art(s) that other operational control flows are within the scope and spirit of the present disclosure.

At operation 402, image repository management application 122 may receive an updated image or a new image from content manager 106. The image update may be a new image for use in the interactive user experience, e.g., an image associated with a new item of content. The image update may also be an updated image that replaces a previously uploaded image. Content manager 106 may identify in image repository management application 122 media content associated with the new or updated image. Content manager 106 may also identify a client type, an image type, an entity name, and other suitable parameters that dictate the usage of the image within the immersive user experience. In another embodiment, image repository management application 122 may identify the client type, image type, and entity programmatically based on information known about content manager 106, the platform on which the content manager is operating, the immersive user experience, and other known information.

At operation 404, image repository management application 122 may tag the image according to a standardized naming convention adhered to throughout service provider system 110 and across platforms incorporated therein. In an embodiment, image repository management application 122 may build a logical path that includes a client type, image type, and entity name and tag the image using the built logical path. In an embodiment, the client type may specify the nature of the subscriber device, e.g., a CPE device, a mobile device, etc. The image type may refer to a specific category of an image on a specific screen in the immersive user experiences, e.g. an EPG grid, a channel logo, a poster, an icon, a banner, a title page, an information screen, etc. The image type may further incorporate an image size and resolution applicable to the image, e.g., the image type may embed a screen width, screen height, and resolution in the image type, separated by underscores, dashes, or other character. In one embodiment, image repository management application 122 may tag the file by including metadata in the image file as stored on disk or memory. In another embodiment, image repository management application 122 may track tagging information separately, e.g., using a database table, with reference to a unique identifier associated with the newly received image.

At operation 406, image repository management application 122 may add the image to image repository 118 or update an existing image in image repository 118 with the new image. Image repository management application 122 may use any suitable file transfer protocol, e.g., HTTP, FTP, etc., to perform the file transfer or copy the image file directly to image repository in localized embodiments. Image repository management application 122 may also set the last modified timestamp for the image as stored on disk or in memory to the current time, i.e., the time that content manager 106 uploaded the image. By updating the last modified timestamp, the delta processing, described above, may identify the image as an image to be included in a subset of images transmitted in response to an image update request.

At 408, image repository management application 122 may update cache layer 116 with the new image. Updating cache layer 116 in this fashion may store in memory the new or updated image such that subsequent image update requests performed by subscriber devices 102.1 through 102.n may be satisfied from cache layer 116 without resorting to accessing image repository 118.

At 410, image repository management application 122 may notify subscriber devices of the change to image repository 118. This step may be performed in embodiments that notify subscriber devices 102.1 through 102.n of a change to image repository 118. This step may not be necessary where subscriber devices 102.1 through 102.n send image update requests when subscriber devices 102.1 through 102.n are powered on or in accordance with a refresh interval. In an embodiment, image repository management application 122 may directly message subscriber devices 102.1 through 102.n with the notification. In another embodiment, image repository management application 122 may employ a suitable message queue, accessible by subscriber devices 102.1 through 102.n, and post a message to the message queue. Subscriber devices 102.1 through 102.n may then access the message queue to determine if an image update request should be formulated and transmitted. In either case, subscriber devices 102.1 through 102.n may receive a notification of the change to image repository 118 and perform an image update request to refresh their local caches of images with the updated images.

Exemplary Method to Employ a Cache Layer

Figure 5:
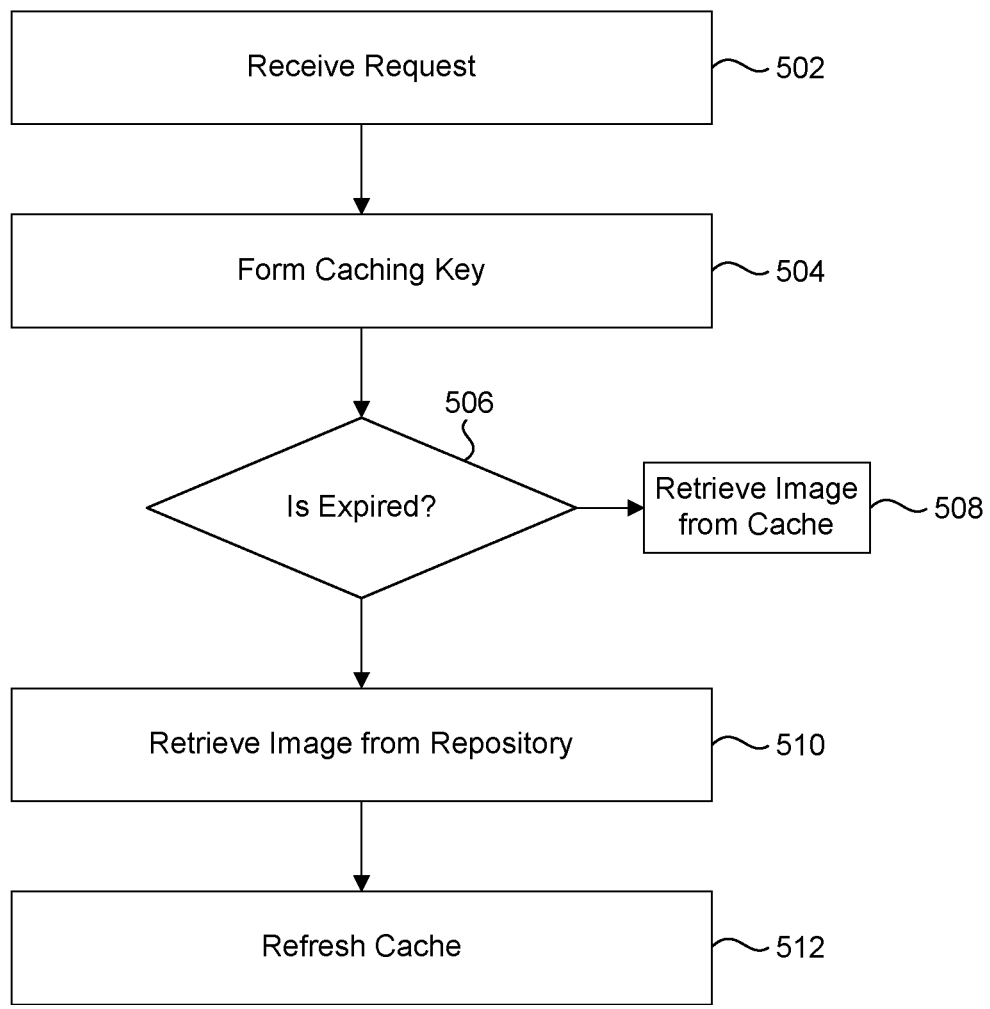
FIG. 5 is a flowchart illustrating a method of employing a cache layer when retrieving an image from an image repository, according to some embodiments.

FIG. 5 is a flowchart of exemplary operational steps to employ a cache layer when retrieving an image from an image repository, according to an embodiment of the present disclosure. The disclosure is not limited to this operational description. Rather, it will be apparent to ordinary persons skilled in the relevant art(s) that other operational control flows are within the scope and spirit of the present disclosure.

At operation 502, image retrieval service 114 may determine an image to retrieve. In one use case, image retrieval service 114 may make this determination while performing the delta processing described above with reference to FIG. 3. Image retrieval service 114 may determine that an image needs to be added to a subset of images for transmission to a requesting subscriber device. In another use case, image retrieval service 114 may provide an image to a subscriber viewing interactive user interface 112, i.e., image retrieval service 114 may be serving the image to interactive user interface 112 while a subscriber views an interactive user experience. In either case, image retrieval service 114 may identify a particular image in image repository 118 to provide to a subscriber or system component.

At operation 504, image retrieval service 114 may form a caching key based on characteristics associated with the image identified in 502. In one embodiment, image retrieval service 114 may retrieve the client type, image type, and image name associated with image from the file metadata or an appropriate database table. Image retrieval service 114 may then build a caching key composed of the client type, image type, and image name to be used in subsequent steps. Any suitable ordering of the fields may be used by image retrieval service 114, provided the cache key is built consistently across platforms.

At 506, image retrieval service 114 may determine if the cache key is expired in cache layer 116. A cache key may be expired when the version of the image file in the cache is not up-to-date with updates made to the image repository. To make such a determination, image repository management application 122 may track a last modified timestamp for each image in image repository 118 and expose this information to image retrieval service 114. Image retrieval service 114 may thus compare the last modified timestamp to a last modified timestamp associated with the image file in the cache layer. If the last modified timestamp from the image repository is greater than the cached version, then image retrieval service 114 knows that the cached version is stale. A cache key may also be expired when the cache key does not exist in the cache layer. This scenario may arise given the finite amount of memory that may be available in cache layer 116. As the cache is updated, cache layer 116 may employ a circular buffering technique, where additions to the cache layer push out staler images, i.e., images that have not recently been accessed. If the cached version of the image is stale or non-existent, then method 500 proceeds to 510. If the cached version of the image is up-to-date, then method 500 may proceed to 508.

In 508, image retrieval service 114 may retrieve the image from cache layer 116 and provide the cached version of the image directly from memory to interactive user interface 112 and/or add the image to a subset of images without accessing image repository 118. Retrieving the image from the caching layer is advantageous because image retrieval service 114 avoids accessing image repository 118. In a system with a large number of subscriber devices, accessing the image repository to retrieve the images may create an I/O bottleneck and satisfying the requests from memory avoids potential slowdowns and shortages.

In 510, image retrieval service 114 may retrieve the image from image repository 118 so that the cache layer may be updated and the appropriate image transmitted or added to the subset of images. Image retrieval service 114 may use any suitable file transfer protocol, e.g., HTTP, FTP, etc., to access the image or copy the image file directly where image retrieval service 114 has direct access.

In 512, image retrieval service 114 may refresh cache layer 116 with the image retrieved in 510. Image retrieval service 114 may then retrieve the image from cache layer 116 and use the cached version to provide the image to interactive user interface 112 and/or add the image to a subset of images without accessing image repository. In this fashion, delta processing and image retrieval are further optimized and the cache layer prepared to process subsequent updates from other subscriber devices.

Exemplary Computer Systems

Figure 6:
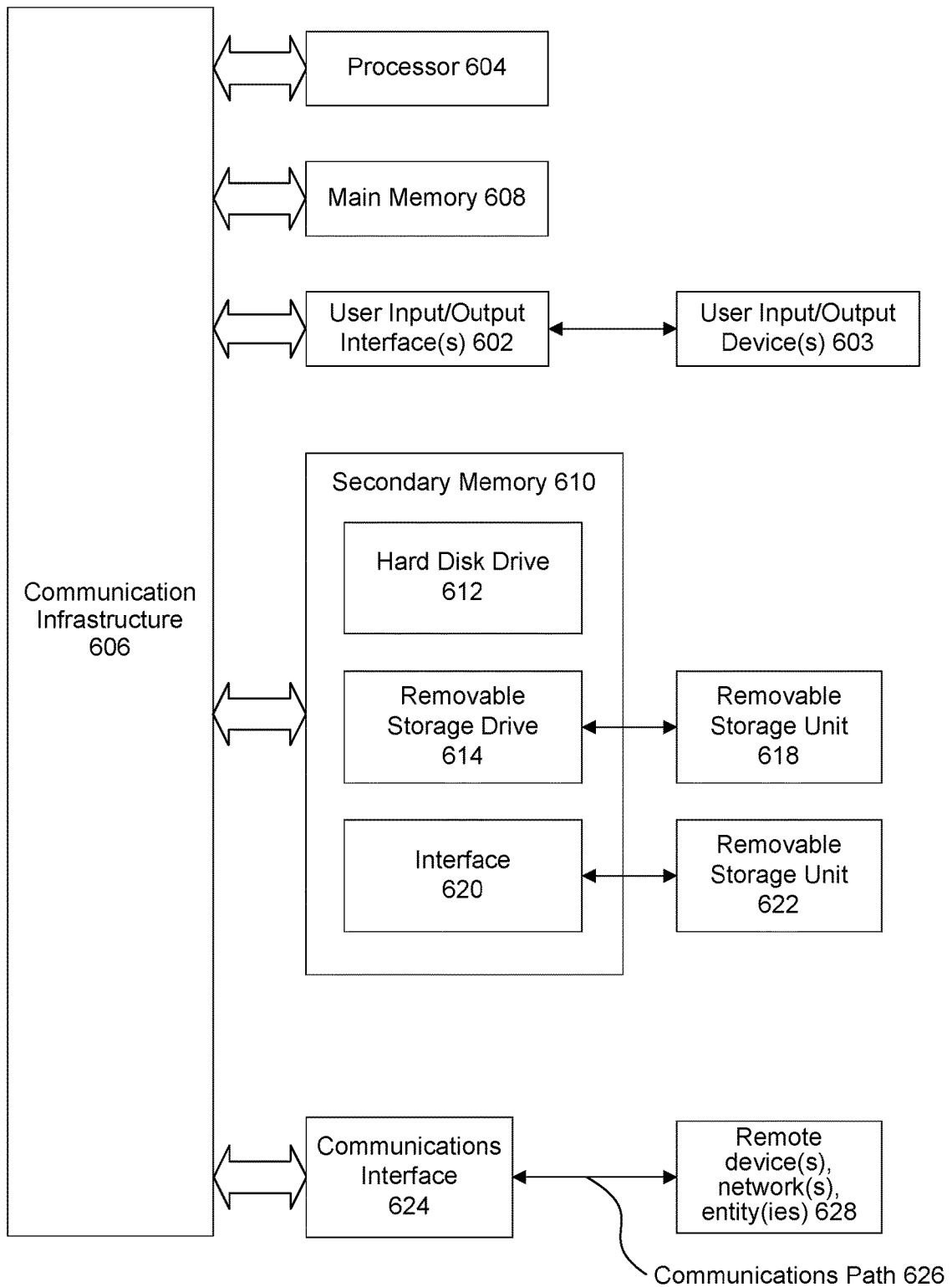
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 608, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    storing, by one or more processors, a plurality of images in an image repository, wherein the plurality of images are displayed in an electronic programming guide provided by a service provider to a subscriber device that receives a service from the service provider, wherein the subscriber device has a local cache that stores the plurality of images;
    tagging, by the one or more processors, each image in the plurality of images with a logical path comprising a client type, an image type, and an entity name, wherein the client type defines an aspect ratio, wherein the image type specifies a dimension and a resolution, and wherein the entity name identifies a specific screen in the electronic programming guide where the image displays;
    receiving, by the one or more processors, from the subscriber device an image update request comprising a last fetch timestamp and a subscriber identifier;
    examining, by the one or more processors, each image in the plurality of images to determine a subset of the plurality of images modified since the last fetch timestamp by comparing the last fetch timestamp to a last modified timestamp of the image;
    transmitting, by the one or more processors, the subset of the plurality of images from a caching layer that stores the plurality of images in memory to the subscriber device identified by the subscriber identifier using the logical path for each image as a cache key in the caching layer; and
    causing, by the one or more processors, the subscriber device to update the local cache based on the subset of the plurality of images.

2. The method of claim 1, wherein the caching layer stores the plurality of images in memory, further comprising:
    transmitting, by the one or more processors, the subset of the plurality of images to the subscriber device directly from the caching layer without accessing the image repository.

3. The method of claim 2, further comprising:
    receiving, by the one or more processors, a refresh interval from a content manager that indicates when to update the caching layer with changes from the image repository; and refreshing, by the one or more processors, the caching layer periodically based on the refresh interval.

4. The method of claim 1, further comprising:

selecting, by the one or more processors, a display image from the plurality of images based on the client type, a device type, the dimension, and the resolution; and causing, by the one or more processors, the subscriber device to display the display image in the electronic programming guide.

5. The method of claim 4, further comprising:

receiving, by the one or more processors, a resize of a screen display; and causing, by the one or more processors, the subscriber device to resize the display image in the electronic programming guide based on the change.

6. The method of claim 1, the transmitting further comprising:

compressing, by the one or more processors, the subset of the plurality of images prior to the transmitting; and causing, by the one or more processors, the subscriber device to decompress the compressed subset of the plurality of images after the receiving.

7. The method of claim 1, further comprising:

providing, by the one or more processors, an image repository management application to a content manager that allows the content manager to upload an additional image;

tagging, by the one or more processors, the additional image; and adding, by the one or more processors, the additional image to the plurality of images.

8. The method of claim 7, further comprising:

sending, by the one or more processors, a notification to the subscriber device to alert the subscriber device about the additional image; and causing, by the one or more processors, the subscriber device to perform the image update request.

9. The method of claim 1, further comprising:

receiving, by the one or more processors, a notification from the subscriber device that indicates that a factory reset was performed on the subscriber device;

retrieving, by the one or more processors, the last modified timestamp for the subscriber device from a database;

examining, by the one or more processors, each image in the plurality of images to determine the subset of the plurality of images modified since the retrieved last fetch timestamp for the subscriber device; and transmitting, by the one or more processors, the subset of the plurality of images to the subscriber device.

10. The method of claim 1, further comprising:

causing, by the one or more processors, the subscriber device to perform the image update request in accordance with a request interval that indicates a frequency.

11. The method of claim 1, wherein the service provides video on demand content.

12. A service provider system comprising:

physical layer circuitry configured to:

store a plurality of images in an image repository, wherein the plurality of images are displayed in an electronic programming guide provided by a service provider to a subscriber device that receives a service from the service provider;

processor circuitry configured to:

tag each image in the plurality of images with a logical path comprising a client type, an image type, and an entity name, wherein the client type defines an aspect ratio, wherein the image type specifies a dimension and a resolution, and wherein the entity name identifies a specific screen in the electronic programming guide where the image displays;

receive from the subscriber device an image update request comprising a last fetch timestamp and a subscriber identifier;

examine each image in the plurality of images to determine a subset of the plurality of images modified since the last fetch timestamp by comparing the last fetch timestamp to a last modified timestamp of the image; and transmit the subset of the plurality of images from a caching layer that stores the plurality of images in memory to the subscriber device identified by the subscriber identifier using the logical path for each image as a cache key in the caching layer, wherein the subscriber device has a local cache that stores the plurality of images and updates the local cache based on the subset of the plurality of images.

13. The service provider system of claim 12, wherein the caching layer stores the plurality of images in memory, the processor circuitry further configured to:

transmit the subset of the plurality of images to the subscriber device directly from the caching layer without accessing the image repository.

14. The service provider system of claim 13, the processor circuitry further configured to:

refresh the caching layer periodically based on a refresh interval that indicates a frequency.

15. The service provider system of claim 12, the processor circuitry further configured to:

provide an image repository management application to a content manager that allows the content manager to upload an additional image;

tag the additional image with a tag; and add the additional image to the plurality of images.

16. A subscriber device that receives a service from a service provider, comprising:

physical layer circuitry configured to:

access a local cache that stores a plurality of images, wherein the plurality of images are displayed in an electronic programming guide provided by the service provider to the subscriber device, wherein the service provider tags each image in the plurality of images with a logical path comprising a client type that defines an aspect ratio, an image type that specifies a dimension and a resolution, and an entity name that identifies a specific screen in the electronic programming guide where the image displays;

processor circuitry configured to:

send an image update request comprising a last fetch timestamp and a subscriber identifier to the service provider, wherein the service provider examines each image in the plurality of images in an image repository to determine a subset of the plurality of images modified since the last fetch timestamp by comparing the last fetch timestamp to a last modified timestamp of the image;

receive the subset of the plurality of images from the service provider, wherein the service provider transmits the subset of the plurality of images using the logical path for each image as a cache key in the caching layer; and update the local cache based on the subset of the plurality of images.

17. The subscriber device of claim 16, the processor circuitry further configured to:
  decompress the subset of the plurality of images.

18. The service provider system of claim 12, the processor circuitry further configured to:
  receive a notification from the subscriber device that indicates that a factory reset was performed on the subscriber device;
  retrieve the last modified timestamp for the subscriber device from a database;
  examine each image in the plurality of images to determine the subset of the plurality of images modified since the retrieved last fetch timestamp for the subscriber device; and
  transmit the subset of the plurality of images to the subscriber device.

19. The subscriber device of claim 16, the processor circuitry further configured to:
  send a notification to the service provider that indicates that a factory reset was performed on the subscriber device; and
  receive the subset of the plurality of images from the service provider that includes images modified since the last fetch timestamp for the subscriber device.

20. The subscriber device of claim 16, wherein the service provides video on demand content.

\* \* \* \* \*